W. WEIS.
FEEDER FOR THRESHING MACHINES.
APPLICATION FILED FEB. 8, 1911.
992,308.
Patented May 16, 1911.
2 SHEETS—SHEET 1.
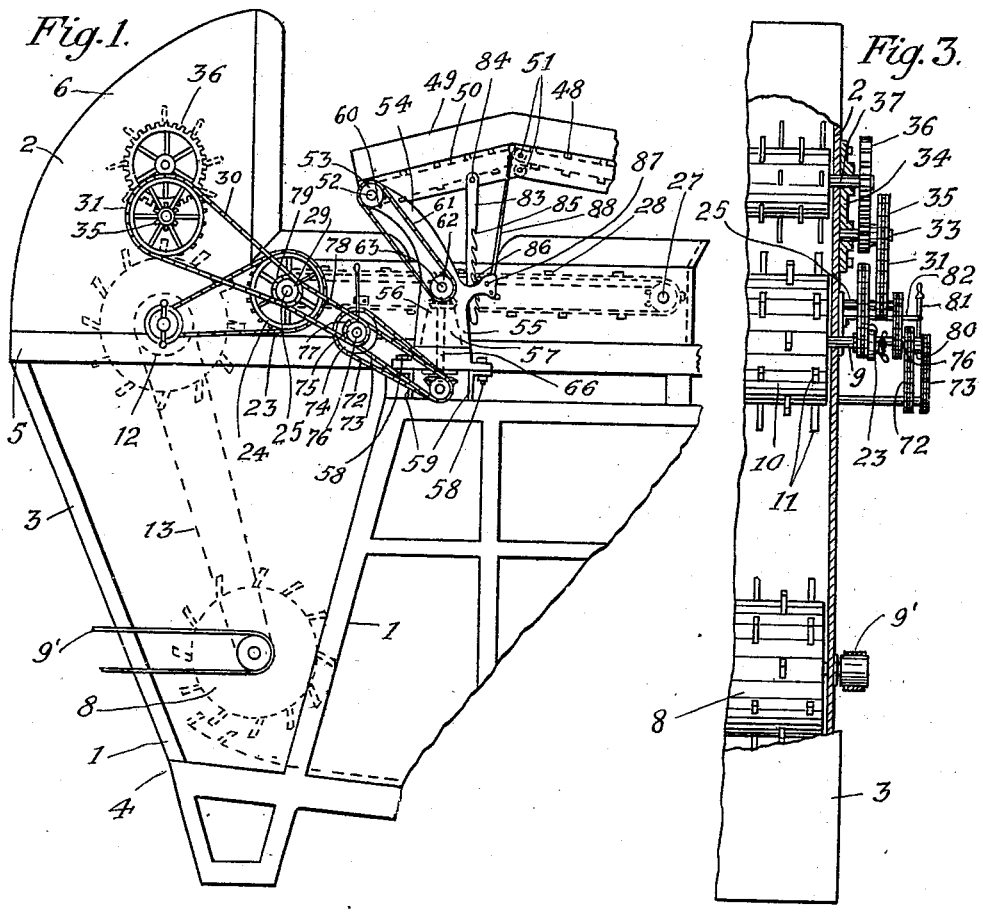
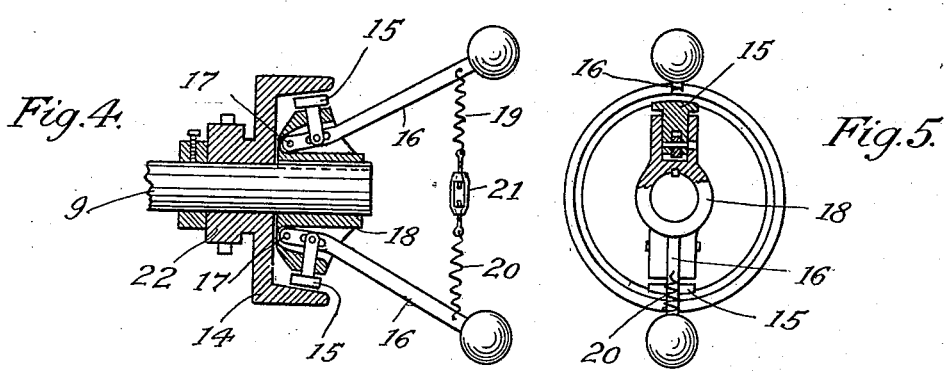
Witnesses:
Theo. Lagaard
C. S. Orvold
Inventor:
William Weis.
By F. A. Whiteley
his Attorney.

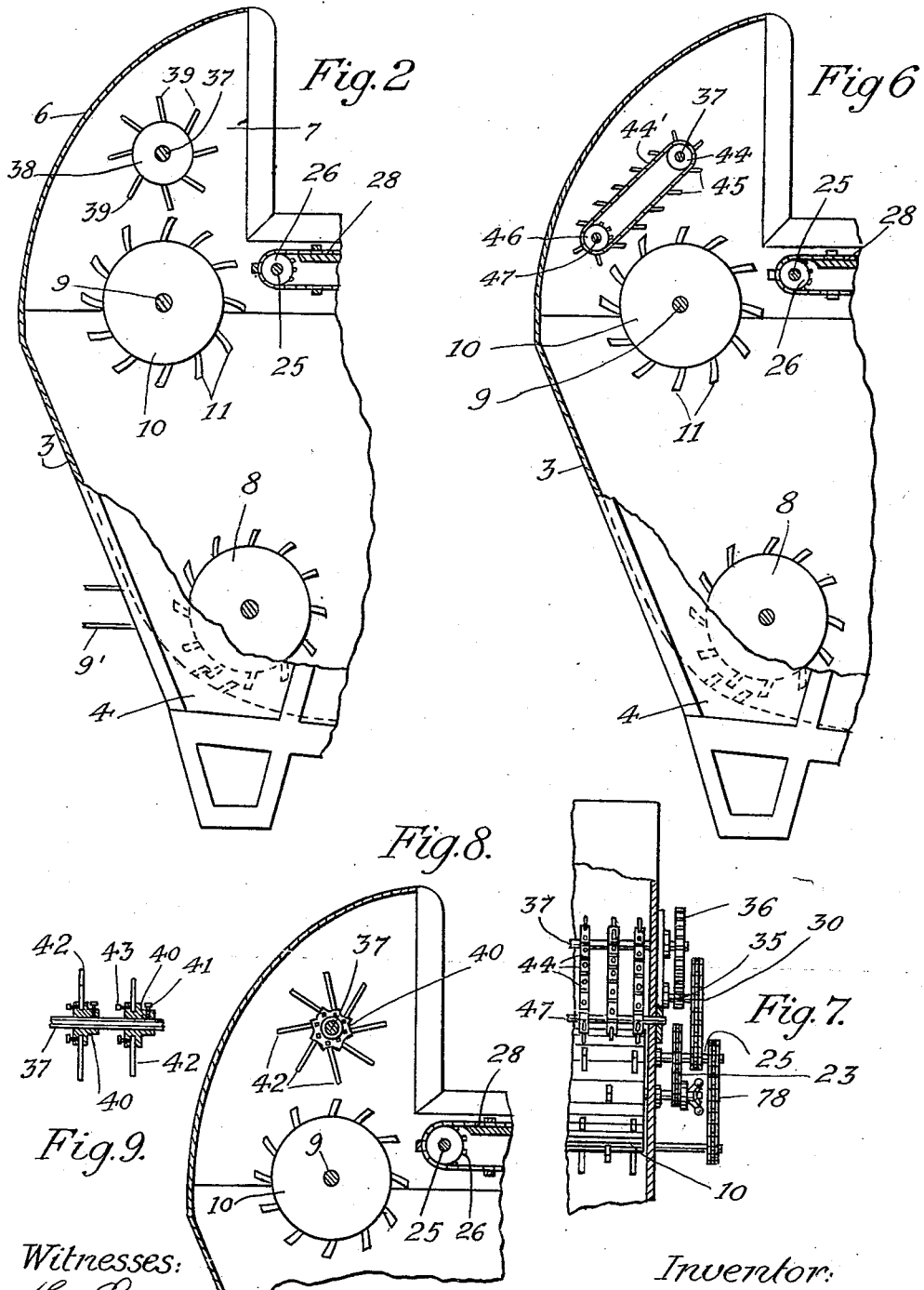

UNITED STATES PATENT OFFICE.

WILLIAM WEIS, OF PERHAM, MINNESOTA.

FEEDER FOR THRESHING-MACHINES.

992,308.          Specification of Letters Patent.     Patented May 16, 1911.

Application filed February 8, 1911. Serial No. 607,256.

*To all whom it may concern:*

Be it known that I, WILLIAM WEIS, a citizen of the United States, residing at Perham, in the county of Ottertail and State of Minnesota, have invented certain new and useful Improvements in Feeders for Threshing-Machines, of which the following is a specification.

My invention relates to feeding devices for threshing machines, whereby the bundles may be conveyed from both sides of the machine to a horizontal carrier at the top thereof, said carrier moving in a direction from the rear to deliver the bundles into a rearward opening of a feed box, otherwise wholly inclosing the front of the machine, said feed box including devices for cutting bands and spreading and retarding the grain as it is fed to the cylinder.

A principal object of my invention is to provide the feed box with a closed front wall and a band cutting and feeding cylinder so related to one another, and to the horizontal conveyer on one side and the curved front wall of the feed box on the other side, as to spread and feed the grain downwardly along said curved front wall to the threshing cylinder in a thin and properly distributed sheet. The band cutting and feeding cylinder alone is driven from the main shaft of the threshing machine, the other moving parts of my feeder being connected to the shaft of said band cutting and feeding cylinder by sprocket chain connections, and another object of my invention is to make this connection such that feeding will not begin until the threshing cylinder is properly speeded, and in case of clogging or stoppage of the feeder, the parts may be disconnected automatically, and injury to the machine avoided.

Other objects and advantages of my improvements will appear in connection with the detailed description thereof and are particularly pointed out in the claims.

In the drawings, which illustrate one form of my invention,—Figure 1 is a side view of my improvements. Fig. 2 is a sectional view taken from the side. Fig. 3 is a partial front elevation with the casing partially removed and in section. Figs. 4 and 5 are section and plan, respectively, of my improved governing connection. Figs. 6 and 7 are end and plan views of a modification. Figs. 8 and 9 are similar views of another modification.

Secured directly to the forward frame members 1 of the machine is a feed box, having end walls 2 and a curved front wall, said front wall comprising an upwardly and forwardly curved portion 3 which extends from the threshing concave 4 to a point 5 from which point it curves upwardly and rearwardly in a sort of hood 6, said curved front wall being connected to the end walls of the feeder and the casing of the machine so as wholly to inclose the front of the machine, and having an opening 7 facing directly to the rear of the threshing machine.

The threshing cylinder 8 at the bottom of the feed box is driven by a belt 9'. Mounted in the feed box above and in front of the threshing cylinder 8 is a shaft 9 of a band cutting and feeding cylinder 10, said cylinder being provided with backwardly curved radial members 11, which operate both to cut the bands and to feed the grain to and along the said curved front wall, said cylinder 10 being spaced from said curved wall so as to provide a proper passage for the grain between the cylinder and the wall. This passage will have a direction with respect to the horizontal feeding means for bringing the grain into the curved feed box (to be described later) such that the grain will be turned at an acute angle by the front wall, and in being thus turned and fed therealong will be spread and retarded before reaching the threshing cylinder. On the shaft 9 is secured a sprocket 12 by means of which said shaft is driven by means of a sprocket chain 13, operated by a sprocket-wheel fast on the shaft of the threshing cylinder 8. At the opposite end of the shaft 9 and loose thereon is a clutch member 14, with which are adapted to coöperate friction devices 15 attached to weight arms 16, which arms are pivoted at 17 to a sleeve 18 splined on the shaft 9, said weight arms being drawn together by springs 19 and 20 connected by a swivel adjusting member 21, by which the tension of said springs upon the weight arms may be varied to meet varying conditions. When the machine is stopped, the weight arms 16 will be drawn together by the springs 19 and 20 and, of course, the clutch member 14 and sprocket 22 thereon, will be free to rotate on said shaft 9. Since, however, the sleeve 18 carrying the weight arms 16 will be rotated by the shaft 9 when the machine is started, such rotation will tend to separate said weight arms against the tension of the springs 19 and 20, and when sufficiently rapid, that is, only when the threshing cylinder has attained a speed high enough for proper threshing, will bring the friction members 15 in contact with the clutch member 14 causing said clutch member and the sprocket wheel 22 thereon to be rotated with the shaft, and through the sprocket chain 23 connected with said sprocket wheel 22 will drive the other moving parts of my feeder. The sprocket chain 23 is connected to a sprocket wheel 24 fast on a shaft 25 which drives a roller 26 upon which, and a rear roller 27, is mounted a horizontal conveyer belt 28. The shaft 25 has thereon a sprocket 29 which is connected by a sprocket chain 30 with a sprocket wheel 31 fast on a sleeve 32 rotatably mounted on a stub shaft 33 secured in a casting 34 bolted to the end 2 of the feeder. The sleeve 32 has thereon a gear 35 meshing with a gear 36 fast on a shaft 37 which carries a retarding roller 38. It will thus be seen that the roller 38 is driven in a direction opposite to the roller 10 so that the adjacent peripheral surfaces of said rollers will be moved in the same direction, the size and arrangement of sprockets 24, 29, 31 and the gears 35 and 36 being such that the cylinder 38 while being rotated, as described, will be rotated at a very much slower rate than the cylinder 10. The shaft 37 will preferably be located directly above the shaft 9, but the toothed periphery of the cylinder 38 will be smaller than that of the cylinder 10. The shaft 25 is preferably located so as to bring the delivery end of the horizontal conveyer 28 somewhat below the top of the toothed periphery of the feeding and band cutting cylinder 10.

The cylinder 38 may, as shown, in Fig. 2, consist of a solid portion into which are set pins 39 slanting backward away from the direction of rotation of said cylinder, or said cylinder may be made up of independent sleeve members 40, as shown in Figs. 8 and 9, said sleeves being independently clamped to the shaft 37 by means of set screws 41 and holding independently removable pins 42 by means of set screws 43, or in place of the members 41, the shaft 37 may have thereon a series of sprockets 44 upon which run a series of endless belts 44′ provided with backwardly extending pins 45 and running around other sprockets 46 mounted on a shaft 47 located farther to the front of the feed box, as shown in Figs. 6 and 7. Whichever form of toothed member is used, it will be rotated or moved in a direction opposite to that of the cylinder 10 so that its toothed periphery adjacent the toothed periphery of the cylinder 10 will move in the same direction, but at a much slower speed, the result of which will be that while the cylinder 10 is cutting the bands and feeding the grain forward the cylinder 38 will operate, first, to press the bundles upon the band cutting and feeding cylinder 10, to insure the cutting of the bands and second, as a retarding means to hold the straw of the upper portion of the bundle so that the entire straw of the bundle may be fed forwardly along and down the curved front wall of the feed box in a spread and hackled condition with the stems all extending in practically the same direction, giving the most desirable possible feed.

The side carriers 48 comprise a main trough-like frame member near the top of which is an angular extension 49 rigidly attached thereto so as to form a continuation of a carrier guideway in which runs an endless belt 50, the upper and lower portion of said belt being carried around the angle of said extension over rollers 51. Each carrier 48 is pivoted at its top end directly to the shaft 52 on which is mounted the roller 53 over which the endless belt 48 continues, and by which said belt is driven. The shaft 48 is held in bearings on arms 54 rigidly connected with a pivot member 55 having a bearing cavity 56 therein, of substantially the shape of the frustum of a cone, which registers over a bearing member 57 attached by bolts 58 to brackets 59 extending from the side frame members of the threshing machine. The belt 50 is driven by roller 53 by means of a sprocket 60 fast on the shaft 52 and sprocket chain 61 running over a sprocket 62 on a short shaft 63 mounted in the top of the pivot member 55, said shaft being driven, through intermediate connections, by one or the other of two sprocket chains 72 and 73 running over different sized sprocket wheels 74 and 75, respectively, on a short shaft 76 mounted to rotate in a sleeve or bearing extending outwardly from the frame of the machine. Said shaft 76 has fast thereon a sprocket 77 which is driven by means of a sprocket chain 78, having a similar sprocket 79 fast on the shaft 25. The sprocket wheels 74 and 75 are loose on the shaft 76 and may be alternatively clutched thereto by clutch 80 mounted between said sprocket wheels and splined to the shaft 76, which clutch is operated by a lever 81 pivoted to a member 82 carried by the end frame of the feeder. By operating the clutch 80, to throw in either one or the other of the wheels 75 and 76, the speed at which the carrier belt 50 is driven may be varied to meet varying field conditions.

When not in use, it is desirable to raise the side carrier 48 and swing the same up over the top of the machine. I affect this raising by means of a bar 83 pivoted at 84 to the carrier 48, said bar being provided with notches 85 in which register pawls 86 of a jacking device pivoted at 87, said jacking device being operated by a handle or lever 88.

In operation, the carriers 48 are turned laterally and lowered so that the lower end thereof is in convenient proximity to the ground. The bundles are laid upon the belts 50 of said carriers with the heads pointing upward, the bundles being placed on both sides of the carriers at either side of the machine simultaneously. Said bundles are conveyed by the carriers to the horizontal conveyer 28 by which the bundles will be carried through the rearward opening 7 of the feed box and presented to the band cutting and feeding cylinder 10 and the retarding and spreading cylinder 38. Since the delivery end of the horizontal conveyer is below the upper peripheral surface of the feeding and band cutting cylinder, the bundles will be engaged by said cylinder first and by it thrown upwardly against the retarding cylinder and upon the pins thereof. The cylinder 38 will tend to hold the bundles upon the cylinder 10, which will cut the band and spread and feed out the straw from the lower side of the bundle while the pins on the cylinder 38 will retard and hold back the straw on the upper side of the bundle, the straw thus fed forward being thrust against the front curved wall of the feed box and by it turned at an angle downward and by this means additionally retarded so that said straw is fed downwardly in a thin sheet with the individual units of straw hackled into comparatively parallel relation. While the pins 39 operate to retard the top layers of each bundle of straw as it is fed forwardly, the revolution of the cylinder 38 in such a direction that these pins are moving with the straw will nevertheless continually withdraw the pins from the bundles as the bundles are fed forwardly, the inclination of the pins 39 backwardly from the direction of rotation of the cylinder 38 rendering such withdrawal more simple and counteracting any tendency of the straw to follow up around the cylinder 38 and cause clogging.

I claim:

1. In combination with the cylinder and concave of a threshing machine, a feeder comprising a feed box having a front wall continuous with said concave and extending upwardly and forwardly and then rearwardly to a point above the top plane of the machine and entirely closing the front of the machine and opening only to the rear thereof, a feeding and band-cutting cylinder mounted within the feed box at a point above and in front of the threshing cylinder and spaced from said front wall so as to form a passage between the cylinder and the front wall, means to rotate the threshing cylinder and the band-cutting and feeding cylinder in the same direction, and means to deliver bundles onto the top of the feeding and band-cutting cylinder, said cylinder operating to cut the bands and feed the straw against the front wall thus causing said straw to be turned at an acute angle and spread and retarded as it is fed along said front wall to the threshing cylinder.

2. In combination with the cylinder and concave of a threshing machine, a feeder comprising a feed box wholly inclosing the front of the machine and opening only to the rear thereof above the plane of the top of the machine and forming an inclosed hood having a curved front wall extending downwardly from said rearward opening to the threshing concave, means for delivering material horizontally into said hood, cylinders in said hood related to said horizontal delivery means so as to receive material therefrom upon the upper and lower adjacent peripheries of said cylinders, and means to rotate said cylinders so that the adjacent peripheries thereof will travel in the same direction and will feed the material against said front wall thus causing it to be turned at an acute angle and spread and retarded as it is fed along said front wall to the threshing cylinder.

3. In combination with the cylinder and concave of a threshing machine, a feeder comprising a feed box wholly inclosing the front of the machine and opening only to the rear thereof above the plane of the top of the machine, a band-cutting and feeding cylinder mounted in said feed box above and forwardly of the threshing cylinder, rotary retarding means mounted above said feeding and band-cutting cylinder in coöperative relation therewith, means on the top platform of the machine to feed bundles horizontally into the rearward opening to the feeding and band-cutting cylinder said cylinder operating to carry said bundles against said retarding means, and driving means and connections for moving the threshing cylinder, the band-cutting and feeding cylinder and the horizontal feeding means in the same direction and for rotating the retarding means in a direction opposite thereto.

4. In combination with the cylinder and concave of a threshing machine, a feeder comprising a feed box wholly inclosing the front of the machine and opening only to the rear thereof above the plane of the top of the machine and forming an inclosed hood having a curved front wall extending downwardly from said rearward opening to the threshing concave, a feeding and band-cutting cylinder mounted within the feed box above and forwardly of the threshing cylinder and in spaced relation to said curved wall, a toothed retarding cylinder mounted within the hood above the feeding and band cutting cylinder, a horizontal conveyer located on the top platform of the machine for delivering bundles into said rearward opening and between the feeding and band-cutting cylinder and the retarding cylinder, and driving means and connections for moving the threshing cylinder, the feeding and band-cutting cylinder, the horizontal conveyer and the retarding cylinder at successively decreased speeds, the retarding cylinder being rotated in a direction opposite to that of the feeding and band-cutting cylinder.

5. A feeder for threshing machines comprising a feed box wholly inclosing the front of the machine and opening only to the rear thereof above the plane of the top of the machine, a band-cutting and feeding cylinder mounted in said feed box, a rotary toothed retarding cylinder mounted above said feeding and band-cutting cylinder in coöperative relation therewith, means to rotate said cylinders so that the adjacent peripheries thereof will move in the same direction and toward the front wall of the feed box, and a horizontal conveyer located on the top platform of the machine positioned to deliver bundles to the feeding and band-cutting cylinder at a point below the top of the upper periphery thereof, whereby the bundles are thrown upwardly against the retarding means to be held thereby while the band-cutting and feeding cylinder cuts the bands and feeds the straw from the lower portion of the bundle against said front wall of the feed box.

WILLIAM WEIS.

Witnesses:
T. SHANNON,
C. W. EHRLICH.

---

Copies of this patent may be obtained for five cents each, by addressing the "Commissioner of Patents, Washington, D. C."